United States Patent
Wald et al.

(10) Patent No.: US 7,493,344 B2
(45) Date of Patent: Feb. 17, 2009

(54) METHOD AND SYSTEM FOR DYNAMIC DATA MERGE IN DATABASES

(75) Inventors: Joe Wald, Houston, TX (US); Muralidhar Prabhakaran, Houston, TX (US)

(73) Assignee: Schlumberger Technology Corporation, Houston, TX (US)

(*) Notice: Subject to any disclaimer, the term of this patent is extended or adjusted under 35 U.S.C. 154(b) by 238 days.

(21) Appl. No.: 11/397,947

(22) Filed: Apr. 3, 2006

(65) Prior Publication Data

US 2006/0224638 A1    Oct. 5, 2006

Related U.S. Application Data

(60) Provisional application No. 60/667,351, filed on Apr. 1, 2005.

(51) Int. Cl.
*G06F 17/30* (2006.01)
(52) U.S. Cl. .............. 707/104.1; 707/1; 707/3; 707/6; 707/10
(58) Field of Classification Search .......... 707/1, 707/3, 4, 10, 6, 100–104.1
See application file for complete search history.

(56) References Cited

U.S. PATENT DOCUMENTS

| | | | |
|---|---|---|---|
| 6,925,477 B1 | 8/2005 | Champagne et al. | |
| 6,931,390 B1* | 8/2005 | Zait et al. | 707/2 |
| 7,146,376 B2 | 12/2006 | Dettinger et al. | |
| 2005/0086213 A1 | 4/2005 | Terao | |
| 2005/0119994 A1 | 6/2005 | Matsunami et al. | |
| 2005/0187974 A1 | 8/2005 | Gong | |
| 2006/0020619 A1* | 1/2006 | Netz et al. | 707/102 |
| 2006/0143464 A1 | 6/2006 | Ananthanarayanan et al. | |

* cited by examiner

*Primary Examiner*—Cam-Linh Nguyen
(74) *Attorney, Agent, or Firm*—Bryan P. Galloway; Osha Liang L.L.P.

(57) ABSTRACT

A data repository defined by a single logical specification includes a data store including a plurality of tables and a view of the plurality of tables, a data dictionary including a meta-table and means to generate the data store, where the meta-table is generated from the single logical specification defining the data repository, and a merge engine configured to merge incoming data with the data store based on match attributes defined by the single logical specification, where the incoming data is stored in at least one staging area.

8 Claims, 6 Drawing Sheets

METHOD AND SYSTEM FOR DYNAMIC DATA MERGE IN DATABASES

CROSS-REFERENCE TO RELATED APPLICATIONS

This application claims priority of U.S. Provisional Patent Application Ser. No. 60/667,351 filed on Apr. 1, 2005. The Provisional Application is incorporated by reference in its entirety.

BACKGROUND

In many industry applications, a large amount of data is generated, collected, and deposited in a database. For example, in the oil and gas industry, geological formation data may be collected during the oil exploration stage. This geological formation data is stored and used for determining the locations where drilling should take place. Further, during the oil production stage, data regarding oil and gas flow rates may be collected to monitor oil production processes. The aforementioned data may then be used to optimize the oil production processes. Regardless of the data's source and/or use, a large investment is often needed to build a database to store the aforementioned data. The databases are typically built with the goal that that all the data is stored and managed such that subsequent search and use of the data is optimal.

The market of local Database Management Systems (DBMS) is dominated by client-server products called SQL Servers, developed by Sybase and Microsoft. SQL Servers are based on the Structural Query Language (SQL). SQL Servers are popular in low-end applications in small businesses and local offices where the local DBMS run on stand-alone desktops and laptops. This is because SQL Servers are of low cost, simple administration, and good performance, as a result of being based on the popular Windows® NT technology (Windows NT is a registered trademark of the Microsoft Corporation, USA). On the other hand, Oracle® (Oracle is a registered trademark of Oracle Corporation, USA) dominates the high-end database market (such as corporate and national repositories) because of its high scalability, reliability, and a wide assortment of features. Oracle® and SQL Servers have many differences, and it is often difficult to support applications on both Oracle and SQL Server. Software vendors (and hence users) are often forced to choose one platform over the other. Migrating data from one platform to another and merging data may require extensive effort. Further, a customized DBMS is often required to run on different platforms.

In the following context, a database instance and a DBMS are collectively referred to as a "data repository". A database instance can have many data stores. A data store contains a collection of tables and views. A table is an array of data. A view is a particular way of looking at a table, and the change of a view does not affect the physical organization of a table. Users are typically not granted access to the tables directly. Rather, they are granted access to views of the tables. A view in a data store provides a standard interface to that data store. Tables and views can be private or public. Conventionally, for a database entity XYZ, a private implementation of a table is represented with XYZ_, and a public interface view is represented with XYZ. The data in a data repository are usually related among themselves, and such a relation is usually defined by a logical specification in the form of a "data model."

Basic operations involving a database include: (1) search, which allows a user to specify search conditions such that the retrieved set of data matches the search conditions; (2) insertion, by which a new set of data with given attributes are inserted into a table; (3) updating, which changes the attributes of a selected data set from a table into new values; and (4) deletion, which delete a data set from a table.

A major part of data management is loading new data into the data repository. The new data may correspond to updated versions of existing data in the database or the new data may correspond to data that is not current stored in the data base. In the form case, the new data is used to populate an existing entity in the database. In contrast, in the later case, a new entity is created in the database and the new data is then used to populate the new entity. It is important to set up rules for deciding whether the incoming data matches existing entities (i.e., is associated with an existing entity). One of the purposes for the aforementioned results is to ensure that the new data have mandatory values and that referential integrity is satisfactory.

In the case of an violation of the rules, the DBMS should have options to completely reject the new data, or to allow partial loading of a consistent subset of the new data. If a violation causes a complete abortion of a transaction, it is potentially dangerous because the database is in an inconsistent state unless all the previously rejected data can be reloaded in a single subsequent transaction. On the other hand, if referential integrity is enforced while loading data, the new data must be provided to the database in the right order. In some cases, the new data includes cyclic references and, thus, there is no way to keep insert the new data in the right order without modifying the manner in which the new data is entered. In such cases, the manner in which new data must be entered into the database is to break the cycles.

As discussed above, there are cases in which the DMBS detects an error in the new data, DMBS typically have a mechanism to detect and report errors. One common mechanism to detect and report errors is to detect errors one at a time as they occur. If there are many errors in the new data, then the aforementioned mechanism makes it is difficult to discover and fix systematic errors. Further, the aforementioned mechanism forces the user t to decide whether to repeatedly fix newly discovered errors and try again or to reject the new data in its entirety.

SUMMARY

In general, in one aspect, the invention relates to a data repository defined by a single logical specification including a data store comprising a plurality of tables and a view of the plurality of tables, a data dictionary comprising a meta-table and means to generate the data store, where the meta-table is generated from the single logical specification defining the data repository, and a merge engine configured to merge incoming data with the data store based on match attributes, where the incoming data is stored in at least one staging area.

In general, in one aspect, the invention relates to a method to merge incoming data with data in a data store including loading data through at least one loader to at least one staging area in a server; reporting and fixing problems in referential integrity, matching data through the use of match attributes in a match table, wherein the match attributes define a plurality of rules to match entities in the staging area with entities in the data store; updating links in the staging area in preparation for the merge, and inserting and/or updating entities in the data store.

Other aspects and advantages of the invention will be apparent from the following description and the appended claims.

DETAILED DESCRIPTION

Figure 1:
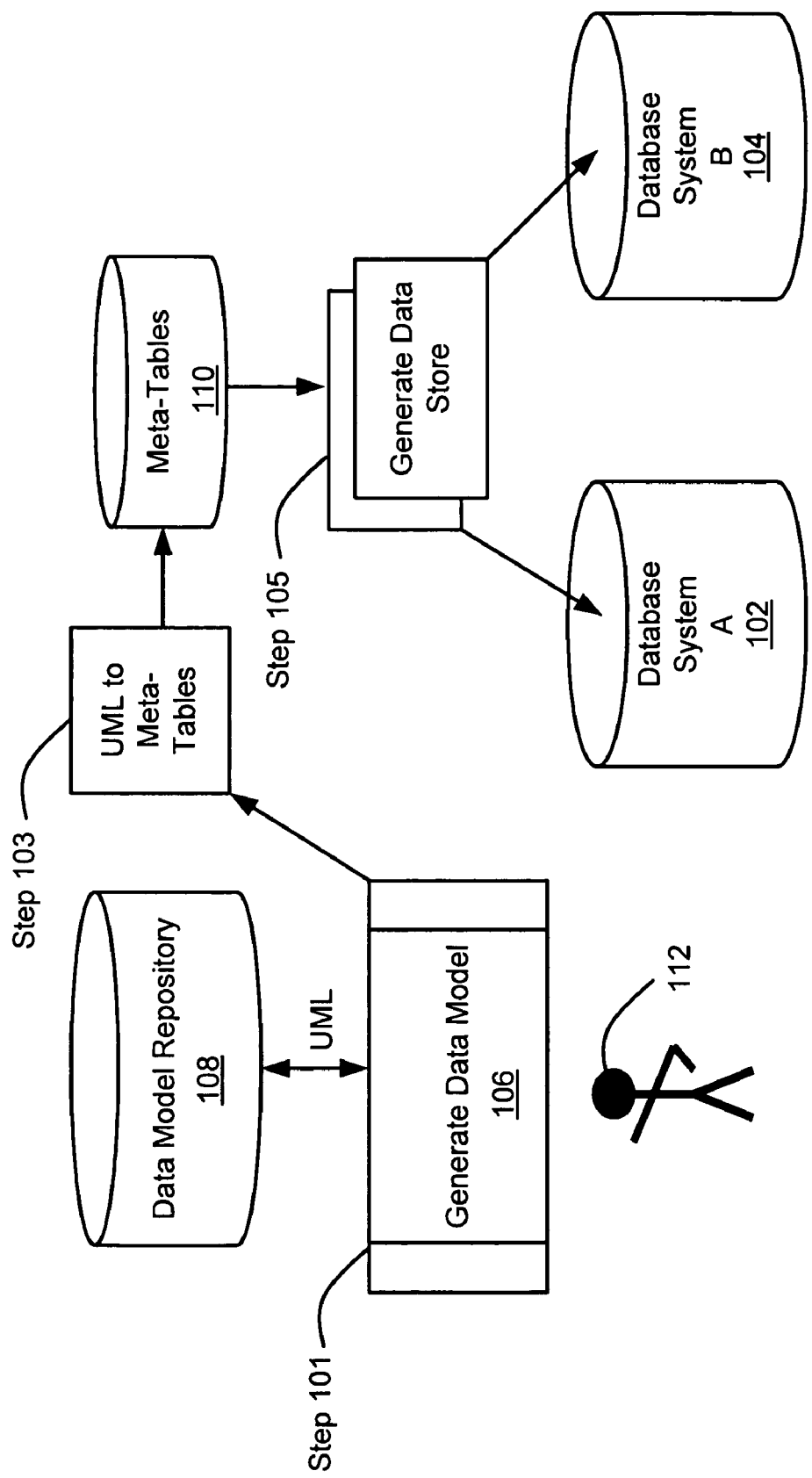
FIG. 1 shows a system diagram of components of a data repository in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to dynamically merge data in databases using a staging area and match attributes.

In one or more embodiments of the invention, a customized data repository is used for implementing one or more aspects of the invention summarized above and described below. In one or more embodiments of the invention, the data repository is used for applications in petroleum exploration and production (E&P), however one skilled in the art will appreciate that the invention is not limited to oil field applications.

FIG. 1 shows a system diagram of components of a data repository in accordance with one or more embodiments of the invention. In one or more embodiments, the data repository (100) of the invention is designed to execute on a variety of underlying database products, including Database System A (102) and/or Database System B (104). In one or more embodiments of the invention, the data repository (100) is built using a commercial tool, such as QDesigner, which is based on the Unified Modeling Language™ (UML). The high-level specification of the data model, which is generated in UML in Step 101, is stored in a UML repository (104). A script (e.g., a Visual Basic script) is used to translate the UML specification of the data model into a relational representation in meta-tables (110) (Step 103). The meta-tables (110) are subsequently used to generate distinct implementations of data stores on the underlying database products (Step 105), such as Database System A (102) and/or Database System B (104) (e.g., Oracle® and/or SQL Server). In one or more embodiments, the invention provides optimal performance and similar behavior on both of the database products (i.e., Database System A (102) and Database System B (104)). Further, in one embodiment of the invention, the meta-tables (110) are also used to automatically generate Hypertext Markup Language (HTML) documentation of the data model. A user (112) may have access to views (not shown) in the data repository (108).

In the examples provided below, the methods of database merging are implemented and described using a particular format. Portions of computer code and or pseudo-code are also used to show embodiments of the invention in a specific form. However, those skilled in the art will recognize that these methods do not depend on a particular platform, a particular data repository, or a specific programming language to function. Rather, embodiments of the invention may be applied to many different DBMS, using many different ways to program computer software instructions with various types of programming languages and implementations.

In order to better understand embodiments of the invention, it is helpful to describe the exemplary data repository referred to below as Seabed. Seabed has services embedded in the database, allowing optimal performance by minimizing context switching, i.e., minimizing network traffic between a client and a server. In one embodiment of the invention, the database is accessible locally as well as remotely.

Seabed can support the same set of applications on various database products or management systems, such as Oracle® and SQL Server, by providing the same data model and similar behaviors on both platforms. In one or more embodiments, Seabed is intended to be applied to various technology fields by being adapted for deployment on laptops on sites of oil wells, in small office environments, as well as on mainframes for large-scale data repositories. In addition, Seabed provides open access for third party applications. In essence, Seabed involves a logical data model and a physical implementation of that data model on a variety of database products, including both Oracle® and SQL Server, in a manner described above in relation to FIG. 1.

The terminology used by Oracle® is different from that used by SQL Server. Accordingly, for the purposes of the invention, the term "account" refers to a user on Oracle®, and refers to a database on SQL Server. The term "user" refers to the login account of a person on Oracle®, and refers to a login into a session in SQL Server. Also, when referring to a database instance, one skilled in the art will appreciate that each instance can have many users.

Figure 2:
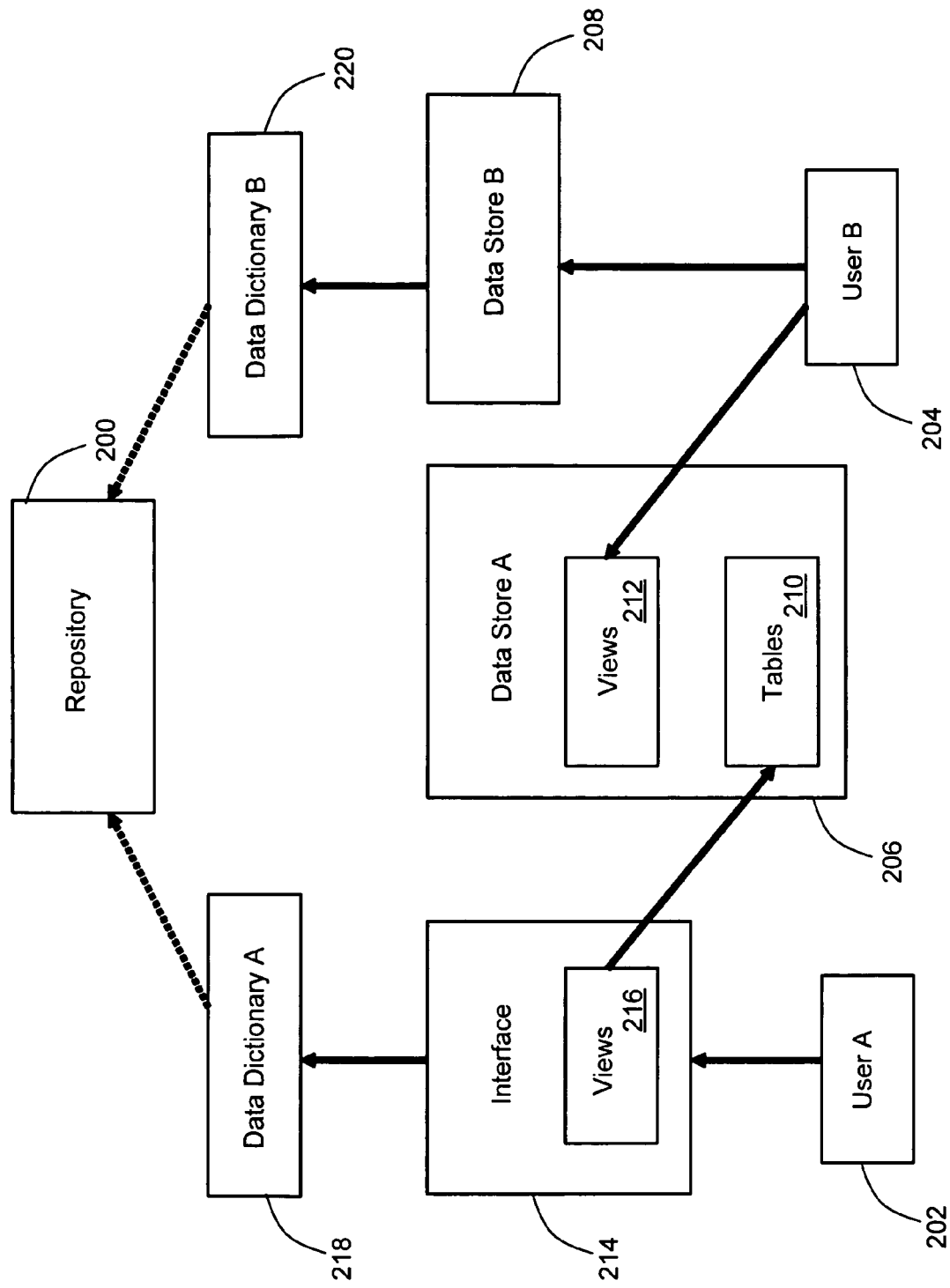
FIG. 2 shows a system diagram of a high level architecture of a data repository in accordance with one or more embodiments of the invention.

FIG. 2 shows a system diagram of a high level architecture of a data repository, such as Seabed, in accordance with one or more embodiments of the invention. An important feature of the data repository (200) of the invention is that a user (User A (202), User B (204)) always logs in as him/herself with a tag identifying this user (User A (202), User B (204)). The user (User A (202), User B (204)) does not log in using simple authentication (i.e., by simply being given privileges to cross a security shell protecting the data repository (200)). The same log in procedure and technique also applies when using a third party application to access the data repository (200) (versus logging directly to the data repository). That is, if the user (User A (202), User B (204)) logs in properly, the user (User A (202), User B (204)) has exactly the same privileges when using a third-party application as they would have if they had logged into the data repository directly (for example, via SQL server).

A data store (Data Store A (206), Data Store B (208)) (sometimes called a project) corresponds to an account. The data store (Data Store A (206), Data Store B (208)) contains a collection of tables (210) and views (212). Users (User A (202), User B (204)) are not granted access to the tables (210) directly; instead, the users (User A (202), User B (204)) are granted access to views (212) over tables (210). The views (212) in the data store (Data Store A (206), Data Store B (208)) provide the standard interface to that data store (Data Store A (206), Data Store B (208)).

In the data repository (200), an auxiliary interface (214) also corresponds to an account. The auxiliary interface (214) contains a collection of views (216) of the tables (210) in a data store (i.e., Data Store A (206)). Users (User A (202), User B (204)) may also be granted access to the views (216) in an auxiliary interface (214). In one embodiment of the invention, the auxiliary interface (214) is intended to support customized services. For example, in a data store, all measurement data (such as mass) are stored using Système International units (e.g., kilograms). The standard interface does not provide a built-in unit conversion service. However, in one or more embodiments of the invention, auxiliary interfaces (214) may be defined to support unit conversion. The same data store may also be associated with auxiliary interfaces (214) configured to support the English unit system, a Production unit system, or a customized unit system. One skilled in the art will appreciate that each data store (Data Store A (206), Data Store B (208)) may have zero or more auxiliary interfaces (214).

Continuing with FIG. 2, a data dictionary (e.g., Data Dictionary A (218), Data Dictionary (220)) is treated as an account. Each data dictionary (Data Dictionary A (218), Data Dictionary (220)) contains meta-tables (not shown) that describe a particular version of the data model. Every data store (Data Store A (206), Data Store B (208)) and interface (214) is generated from a particular data dictionary (e.g., Data Dictionary A (218), Data Dictionary (220)). In one embodiment of the invention, the data dictionary (Data Dictionary A (218), Data Dictionary (220)) also contains reference tables that are shared by all data stores (Data Store A (206), Data Store B (208)) of that particular version. One skilled in the art will appreciate that because the data repository (200) of the invention allows a database instance to contain more than one data dictionary, clients can upgrade data stores individually from one version to another and can safely extend one data dictionary without impacting data stores generated from other data dictionaries.

A system account, referred to as "SDS_Sys" on both Oracle® and SQL Server platforms, is an account of the data repository (200) that keeps track of all the data stores (Data Store A (206), Data Store B (208)), interfaces (214), and data dictionaries (Data Dictionary A (218), Data Dictionary (220)) associated with a single database instance. One skilled in the art will appreciate that the database instance can have only one system account and that the system account contains stored procedures for securely managing the privileges of a user (User A (202), User B (204)).

Before database merging is enforced, any user (User A (202), User B (204)) can be a regular user in the sense that such users need not be created by the system. This allows user management to be handled more easily by systems built on top of the data repository. It also allows users created by a database administrator or third party tool to access the data stores (Data Store A (206), Data Store B (208)) subject to the privileges managed by system.

One skilled in the art will appreciate that most of the services in the data repository are available by making simple calls using SQL, such as select, insert, update, and delete. These services are implemented via views, instead of triggers on views and table triggers within Oracle® and/or SQL Server. In one or more embodiments of the invention, objects and underlying tables are generated automatically by the data model. Some of the services, such as data merge and data transfer, are available only by invoking stored procedures in the database.

Figure 3:
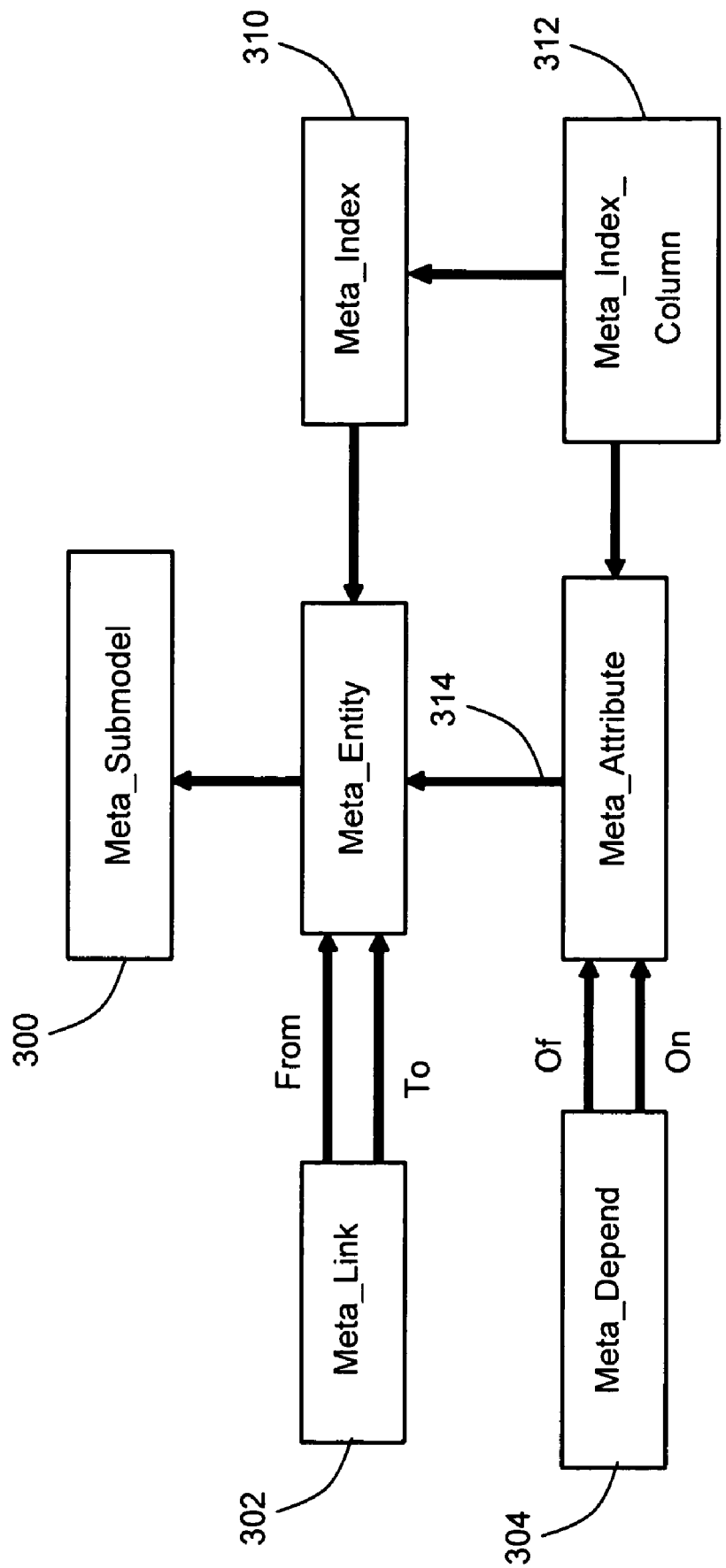
FIG. 3 shows a diagram of entities and relationships of the data model for the data repository in accordance with one or more embodiments of the invention.

FIG. 3 shows a diagram of entities and relationships of the data model for the data repository in accordance with one or more embodiments of the invention. Specifically, the data repository of the invention uses the meta-tables, which are created from the data model, to describe a data model and generate tables and views. Meta-tables are also used to configure services implemented in the database via table triggers and "instead of" triggers. As shown in FIG. 3, the boxes (300, 302, 306, 308, 310, 312) contain the names of the meta-tables. An arrow (e.g., 314) from one box to another box represents a reference (e.g., there is a reference from Meta_Attribute (308) to Meta_Entity (306)). HTML documentation for all entity types in the data model is generated automatically from the meta-tables. The HTML document has many live links, which allow convenient navigation.

The data repository of the invention provides open access via standard SQL. Moreover, the invention ameliorates the differences between Oracle® and SQL Server so that the same set of applications can execute on both platforms. The implementation of the invention in both Oracle® and SQL Server is described below. One skilled in the art will appreciate that while the implementation of the invention described below is described with regard to only Oracle® and SQL Server, the implementation may be performed in a similar fashion on any database platform or management system (e.g., Sybase, Informix, DB2, Oracle®, SQL Server, or other similar DBMS).

Figure 4:
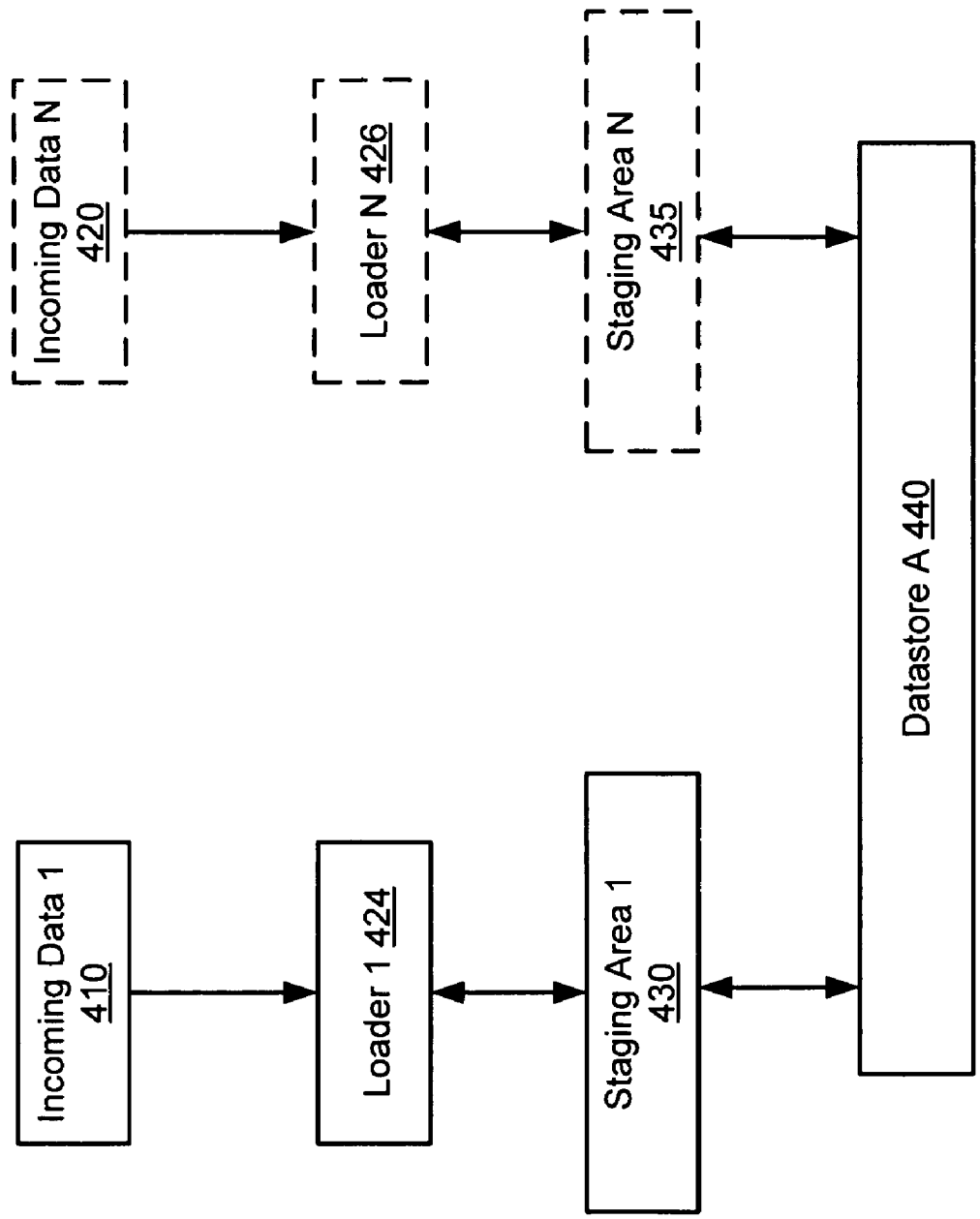
FIG. 4 shows a system for system for dynamic data merging in accordance with one or more embodiments of the invention.

FIG. 4 shows a system for dynamic data merging in accordance with one or more embodiments of the invention. As shown in FIG. 4, the system includes numerous components, including one or more staging areas (Staging Area 1 (430), . . . Staging Area N (435)), at least one datastore (Datastore A (440)), and one or more loaders (Loader 1 (424), . . . , Loader N (426)). Each of these components is described below and may be located on the same device (e.g., a server, mainframe, supercomputer, desktop PC, laptop, PDA, etc.) or may be located on separate devices connected by a network (e.g., the Internet), with wired and/or wireless segments.

In one or more embodiments of the invention, each datastore (Datastore A (440)) may include one or more tables and/or one or more views (as discussed above). When more than one datastore is present, the datastores may all belong to the same type of database management system or may belong to different types of database management systems (e.g., SQL Server, Oracle®, DB2, etc.). Those skilled in the art will appreciate that all database management systems carryout similar operations against datastores such as deleting, inserting, and updating data. Those skilled in the art will also appreciate that tables in a datastore may enforce constraints on incoming data (e.g., mandatory values, referential integrity, order of loading, etc.).

In one or more embodiments of the invention, the loaders (Loader 1 (424), . . . , Loader N (426)) are used to load incoming data (Incoming Data 1 (410), . . . , Incoming Data N (420)) into a staging area (Staging Area 1 (430), . . . , Staging Area N (435)). Incoming data may originate from any source (e.g., a user, a third-party application) and may be forwarded to any target datastore (e.g., Datastore A (440)). In one or more embodiments of the invention, the loaders may trigger the Merge Engine (not shown) to commence the merge process (discussed below) after loading data into a staging area.

In one or more embodiments of the invention, a staging area (Staging Area 1 (430), . . . , Staging Area N (435)) provides temporary storage for the incoming data. The incoming data may or may not be in a format suitable for the target datastore. In one or more embodiments of the invention, the staging area may be an account with the same tables as the target datastore, but without the constraints imposed on incoming data (discussed above). In other words, no constraints (e.g., mandatory values, referential integrity, etc.) are enforced on data coming into a staging area. Further, incoming data may be loaded into a staging area in any order. The Merge Engine (not shown) will take the data in the staging areas and insert or update the data into one or more target datastores.

Figure 5:
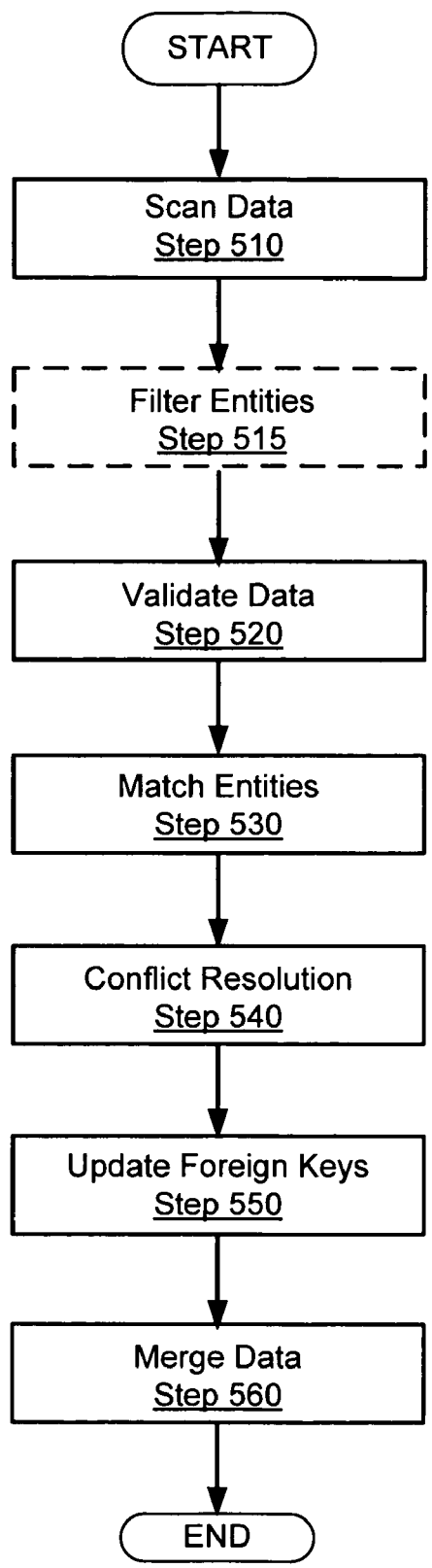
FIG. 5 shows a flowchart in accordance with one or more embodiments of the invention.

FIG. 5 shows a flowchart of the merging process in accordance with one or more embodiments of the invention. In STEP 510, the data in a staging area is scanned to determine which entity types are populated. In STEP 515, the data in the staging area may be filtered. In one or more embodiments of the invention, STEP 515 may be optional. In STEP 520, the data in the staging area is validated. In one embodiment of the invention, the data is validated by analyzing the data to ascertain the presence of referential integrity violations. In STEP 530, matching entity instances between the staging area and the target datastore are determined. In STEP 540, records in the staging area that have been updated more recently than the matching records in the target datastore are located. In one or more embodiments of the invention, STEP 540 is optional. In STEP 550, all foreign key references in the staging area are updated to reflect the matching entities (STEP 530) in the target datastore. In STEP 560, validated data is moved from the staging area into the target datastore. Each of these steps is discussed in greater detail below.

Those skilled in the art will appreciate that one or more embodiments of the invention may be implemented with more or less steps than shown in FIG. 5. Those skilled in the art will also appreciated that in one or more embodiments of the invention, the sequence of steps shown in FIG. 5 may be arranged in a different order. In one or more embodiments of the invention, number of steps taken, the order of the steps taken, and the options invoked within the steps taken are all dependent on type of workflow: (i) Loader Workflow, (ii) Synchronization Workflow, and (iii) Long Transactions workflow (all discussed below):

Loader Workflow

In the standard loader workflow, the Filter Step (STEP 515) is invoked with the Last Option to keep only the latest version of an entity in the staging area (discussed below). In one or more embodiments of the invention, a Loader-lite workflow skips the Filter Step (STEP 515) in its entirety.

Synchronization Workflow

The synchronization workflow is used for the repeated transfer of data between two databases in one or both directions. In the synchronization workflow, the match step (STEP 530) is invoked with the Globally Unique ID Option (GUID Option). This workflow also invokes the Delete Option in the Conflict Resolution Step (STEP 540) (discussed below).

Long Transactions

Those skilled in the art will appreciate a traditional database transaction takes place in the context of a single database session. After a transaction is started, the transaction must either be committed or rolled back before another transaction can occur. A long transaction spans several sessions. A managing process can start a long transaction in one session. The process can then suspend without committing or aborting the transaction. The process can resume, make changes, and suspend several times. Finally, the process can decide to commit or abort the long transaction.

In one or more embodiments of the invention, a staging area (Staging Area 1 (430), . . . , Staging Area N (435)), is used to implement long transactions. Before a session is suspended, changes are committed to the staging area. However, the long transaction is not committed to the target data store until the staging area is merged to the project. In the long transaction workflow type, the Conflict Resolution Step (STEP 540) is invoked with a Report Option. The Merge Step (STEP 560) may be invoked with an ID Option the specifies matching is done by ID rather than by match rule.

Referring back to FIG. 5, as discussed above, the data in a staging area is initially scanned to determine which entity types are populated (i.e., have instances) (STEP 510). In one or more embodiments of the invention, the populated entity types may be stored, for example, in a table. All subsequent steps may first consult the table to avoid processing entity types with no instances. In one or more embodiments of the invention, determining which entity types are populated may take place while the data is being loaded into a staging area.

In STEP 515, the data in the staging area is filtered providing duplicate checking and limited auto-correction. The filtering process is responsible for removing duplicate entities in the staging area. In one or more embodiments of the invention, the filtering process determines which of the duplicate entities in the staging area has the largest ID. The remaining duplicate entities with smaller IDs are deleted.

In STEP 520, the data in the staging area is checked for referential integrity violations. In one or more embodiments of the invention, one or more referential integrity violations may be corrected using a Trim Option. When the Trim Option is invoked, all references originating from the data within a staging area that are mapped to surrogate IDs for which there are no corresponding entities in the staging area are nullified. The remaining (i.e., non-null) links still violating referential integrity may be corrected by setting such links to a value that will be ignored during the update. In one or more embodiments of the invention, the process only proceeds when no referential integrity violations exist. In one or more embodiments of the invention, reports are generated when referential integrity violations do exist.

In STEP 530, an attempt is made to find matching entity instances between the staging area and the target datastore. In one or more embodiments of the invention, for each populated entity type in the staging area, STEP 530 generates and executes SQL statements of the following form:
INSERT INTO SDS_Match (Target_Id, Stage_Id, Entity)
SELECT Old.Id, New.Id, '<Entity>'
FROM <Target>.<Entity>Old, <Entity>New
WHERE <Match_Query>

The SDS_Match table keeps track of all successful matches. In one or more embodiments of the invention, the Match_Query is generated using match rules (discussed below) based on match attributes. Match attributes are specifications for describing rules to match entities in the staging area with entities in the target project. Consider the following example, which in no way is intended to limit the invention. The match attributes of several entities are specified in the SDS_Match_Attribute table provided below:

select Entity, Match_Attribute from SDS_Match_Attribute

| Entity | Match_Attribute |
|---|---|
| Well | UWI |
| Borehole | Name |
| Borehole | Well |
| Feature_Boundary | Name |
| Well_Marker | Name |
| Well_Marker | Source |

-continued

| Entity | Match_Attribute |
|---|---|
| Well_Marker | Borehole |
| Well_Marker | Feature_Boundary |

As shown in the table above, some of the match attributes may be data columns (e.g., UWI, Name, Source), while some of the match attributes may be other entities (e.g., Well, Borehole, Feature_Boundary). In one or more embodiments of the invention, if an entity has a natural key defined in the data model, then those attributes are used as the default match attributes. Custom match attributes may be defined in a workflow whether or not a natural key exist. However, all workflows must honor the natural key in the sense that two instances with the same natural key are not allowed. Match attributes for an entity may be defined by inserting values into the SDS_Match_Attribute table (shown above) using, for example, a Graphic User Interface (GUI).

As discussed above, in one or more embodiments of the invention, match attributes may be used to generate instructions (e.g., SQL statements) to match entities. Consider the following example, which in no way is intended to limit the invention. In the SDS_Match_Rule table (shown below), the match attributes associated with each entity are used to generate a Match_Code attribute for the entity. The Match_Code attribute may be a SQL fragment used to define the Match_Query component of an SQL statement for matching the entity.

select Entity, Match_Code, Rank from SDS_Match_Rule

| Entity | Match_Code | Rank |
|---|---|---|
| Well | Old.UWI = New.UWI | 1 |
| Borehole | , SDS_Match M1 WHERE Old.Name = New.Name AND Old.Well_Id = M1.Target_Id AND New.Well_Id = M1.Stage_Id | 2 |
| Feature_Boundary | Old.Name = New.Name | 1 |

Thus, the Match_Code attribute for Well may be used to dynamically generate the following example SQL statement in the Match Step (STEP 530) for the Well entity:
INSERT INTO SDS_Match (Target_Id, Stage_Id, Entity)
SELECT Old.Id, New.Id, 'Well'
FROM <Target>.Well Old, Well New
WHERE Old.UWI=New.UWI The Match_Code for Borehole refers to the SDS_Match table because it has a match attribute that is a link to another entity. This means that it is a recursive match rule. The Match_Code for Borehole may be used to generate the following example SQL statement in the Match Step (STEP 530):
INSERT INTO SDS_Match (Target_Id, Stage_Id, Entity)
SELECT Old.Id, New.Id, 'Borehole'
FROM <Target>.Borehole Old, Borehole New, SDS_Match M1
WHERE Old.Name=New.Name
AND Old.Well_Id=M1.Target_Id
AND New.Well_Id=M1.Stage_Id;

From the above SQL statement, it should be clear to one skilled in the art that Well_Id cannot be compared directly in the match query because the original ID of the well in the staging area is different from the ID of the matching well in the target data store. The match rule for Well must be carried out first so that the required Well entries are inserted into the SDS_Match table before the match rule for Borehole can be carried out.

The order in which match rules are carried out is important when there are recursive match rules. In the example above, the Rank attribute in the SDS_Match_Rule table specifies the order in which the match rules should be carried out.

Recursive matching also applies to multiple dependencies in a single rule. For example, assume that the match rule for Well_Marker depends on links to borehole and feature boundary, and the match rule for Borehole and Feature_Boundary could depend on other entities, then the match query for Well_Marker may be generated, for example, as follows:
INSERT INTO SDS_Match (Target_Id, Stage_Id, Entity)
SELECT T.Id, New.Id, 'Well_Marker'
FROM <Target>.Well_Marker Old, Well_Marker New, SDS_Match M1, SDS_Match M2
WHERE Old.Name=New.Name
AND Old.Source=New.Source
AND Old.Borehole_Id=M1.Target_Id
AND New.Borehole_Id=M1.Stage_Id
AND Old.Feature_Boundary_Id=M2.Target_Id
AND New.Feature_Boundary_Id=M2.Stage_Id;

There is one join with the SDS_Match table for boreholes and another join for feature boundaries. Further, recursive match rules enhance performance by reducing the total number of joins.

Those skilled in the art will appreciate that it may not always be possible to specify complex match rules using simple match attributes. In such cases, a match rule specification language may be used to specify more sophisticated match rules. The match rule specification language is intended to make it easy to specify sophisticated match rules and then generate the corresponding complex code. Example match rules specified by the match rule specification language are provided below. A discussion of the match rule specification language's constructs follows.

Match Rule Examples

Well
UWI

Well_Marker
Name, Source, Borehole, Feature_Boundary

Event
Event_Classification, Event_Type, Start_Date!, Borehole, Facility?

Core_Bit
Core_Bit_Type, Existence_Kind, Name, −Core_Bit_Used

BHA
Name, Existance_Kind, −Facility=Activity_Facility_Invl [Activity=Activity_Program]

Bent_Sub
Existence_Kind, Name, −Part_Facility[Linear_Sequence, Whole_Facility=BHA]

Optional Attributes

The construct X! in the match rule specification language means that attribute X is mandatory in the rule even though it may be optional in the data model. For example, the Start_Date relationship in the match rule for Event is specified to be mandatory even though it is optional in the data model. The Merge engine generates the extra logic for optional attributes so that null values match.

Optional Relationships

The construct R? in the match rule specification language may infer relationship R is optional in the match rule. For example, the Facility relationship in the rule for Event is optional. For two events to match this means that either the referenced facilities must match or both Facility relationships must be null. Unless a relationship is followed by a question mark, it is assumed to be mandatory (i.e., not null) in a match rule even if it is optional in the data model.

The Merge engine generates the SQL code to support optional relationships. This is similar in effect to an outer join but the engine implements this more efficiently as a special case of recursive matching.

Inverse Relationships

The in the match rule specification language construct –R may be used to designate the traversal of relationship R in the inverse direction. The inclusion of an inverse relationship in a match rule is similar to the inclusion of a (forward) relationship; it implies the target of the relationship must match in order for the current entity to match.

Narrowing the Domain of a Relationship

The construct R=N in the match rule specification language may be used to narrow the domain of abstract relationship R to N in the context of this match rule; otherwise, the domain of the relationship is as defined in the data model. For example, in the match specification for BHA, the abstract Activity relationship is narrowed to Activity_Program in the context of this match rule.

The construct –R=N may also be used to specify the domain of an inverse relationship. However, it is used when the inverse is ambiguous, not because the relationship is abstract. For example, in the match specification for BHA, the Facility relationship is traversed in the inverse direction to the Activity_Facility_Invl entity. Since there is more than one entity that refers to BHA using a Facility relationship, the domain of the inverse relationship must be explicitly specified.

Traversing an Entity

The construct R[list] in the match rule specification language may represents a constraint on the domain of relationship R. This list can be comprised of attributes and relationships. A constrained entity is traversed as part of the match rule but it is not required to have matches in the SDS_Match table before the match rule is carried out.

An unconstrained entity must have matches in the SDS_Match table before the match rule is carried out. For example, the match rule for BHA cannot be carried out until after there is a match for Activity_Program.

In the match specification for Bent_Sub, the Part_Facility relationship is traversed in the inverse direction to Facility_Composition (since it is the only entity that refers to Bent_Sub using a Part_Facility relationship). The traversed Facility_Composition entities are constrained to refer to matching BHAs via the Whole_Facility relationship. In addition, the Linear_Sequence attribute of those Facility_Composition entities must match.

Mutually Exclusive Relationships

The construct R|S| . . . |T in the match rule specification language may infer that exactly one of the relationships must be non-null and match while all the other relationships must be null. That is, the relationships are mutually exclusive. The use of this construct is more efficient than R, S, . . . , T because a comma-separated list with N relationships requires N joins with the SDS_Match table, while N mutually exclusive relationships require only one join to the SDS_Match table.

In one or more embodiments of the invention, the merge engine is designed to support workflow-specific merge behaviors. For example, the SDS_Match_Attribute and the SDS_Match_Rule tables (defined in the data dictionary as shown in FIG. 2 and the associated text) have a Workflow attribute so that the matching behaviors of multiple workflows can be described.

In one or more embodiments of the invention, it may also be possible to define workflow-specific actions depending on whether a match exists. The ON Match condition indicates that an incoming entity matches an existing entity. The most common action for this condition is to Update the existing entity. However, there can be workflows where other actions are meaningful. For example, the Delete action causes the existing entity to be deleted and the incoming entity to be discarded. The Abort action is meaningful in a workflow where only new data are expected and a match is considered a fatal error condition.

In one or more embodiments of the invention, a NO Match condition indicates that no match exists between an incoming entity and an existing entity. The most common action for this condition is to Insert the incoming entity. However, other workflows may exist where other actions are meaningful. The Abort action is appropriate in a workflow where only matching data is expected and a failure to match is considered a fatal error condition. The Ignore action makes sense in a workflow where inserts are allowed but updates to existing records are ignored.

In one or more embodiments of the invention, the Update action for ON Match and the Insert action for NO Match are supported. Workflows may be defined with default actions for both ON Match and NO Match, and may override actions for specific entities.

In one or more embodiments of the invention, all the data transfer workflows are described in a table. A user may select which workflow to use when the merge process is invoked.

In one or more embodiments of the invention, once matching has been complete for every populated entity type in Staging Area (430), additional integrity checks are performed. Based on the definition of unique keys in the Meta_Index table (shown in FIG. 3 and discussed in the associated text above), the Match Step (STEP 530) checks for violation of uniqueness rules between entities in the staging area and entities in the target datastore. A check is also made to ensure any entity without a match has a non-null value for all of its mandatory attributes. Finally, a check is also made to ensure that an entity in the datastore has at most one match to entities in the staging area.

In one or more embodiments of the invention, Data Synchronization workflows may use Globally Unique Identifiers (GUIDs) as the first match rule and the another set of attributed as a the second match rule for an entity. The Match step supports a GUID option that automatically matches by GUIDs before looking at other match rules (if any).

Still referring to FIG. 5, in STEP 540, records in a staging area that have been updated more recently than the matching records in the target datastore are flagged as a conflict. In one embodiment of the invention, records flagged as conflicts in the staging area are deleted. If the conflict resolution step (STEP 540) deletes flagged records, the step is referred to as invoking the Delete Option. In one or more embodiments of the invention, records flagged as conflicts in the staging area are reported. If the conflict resolution step (STEP 540) reports flagged records, the step is referred to as invoking the Report Option.

In STEP 550, all foreign keys referenced in the staging area are updated from placeholder entities to the matching entities in the target data store. For example, if there is a Well with Id=100 and UWI='Gusher' in Staging Area (430) and a Well with Id=200 and UWI='Gusher' in the target datastore, then based on the match rule, these two entities refer to the same well. Similarly, if there are boreholes in Staging Area (430) with Well_Id=100, then STEP 550 sets Well_Id=200 for these boreholes.

In one or more embodiments of the Update Step (STEP 550), the Update Step may also support a Map Option. When this option is invoked, all entities in the staging area that do not match an entity in the target data store are assigned a new valid ID from the sequence generator in the target store, or from the sequence generator in the data dictionary in the case of shared resources.

In STEP 560, data a staging area is moved into the target datastore. Those skilled in the art will appreciate the Merge Step may be executed by using, for example, the Merge statement in Oracle®, or the Insert and Update statements of SQL Server. Those skilled in the art will also appreciate that should the Merge Step fail for any reason, a rollback procedure must be called to ensure the datastore is returned to a consistent state.

Locking

In one or more embodiments of the invention, the merge engine can support a variety of locking strategies in order support merge sessions that completely overlap or partially overlap. Each target data store supports a merge lock such that only one application can hold the merge lock of that data store at a given time. An application requesting a merge lock held by another application must wait until the other application has released the lock. The lock is automatically released if an application dies without releasing it.

In general, a merge workflow acquires a merge lock after it has updated foreign keys in the staging area but before the final merge step (STEP 560). The lock is released after the merge step is completed. In this case, multiple loader workflows can run in parallel (as shown in FIG. 4) except for the final merge step in which they must be serialized. In one or more embodiments of the invention, the merge lock is acquired before updating foreign keys in the staging area.

In the case of a merge session where the number of entities to be loaded and/or updated is less than a given threshold, the merge engine uses a single transaction to modify the staging area. If there is any problem with the merge step, then the database automatically rolls back the transaction. For merge sessions with a greater number of entities (greater than the threshold), the merge engine uses its own mechanism to rollback the changes. In one or more embodiments of the invention, merge locks are not used because small merge sessions are highly reliable. Accordingly, multiple merge sessions that are sufficiently small can run at the same time.

The variety of locking strategies gives the user (or application designer) control of the tradeoff between throughput (running multiple loaders at the same time) and minimization of conflicts between simultaneous loaders. Only a knowledgeable user can reason when it is safe to run multiple merge sessions at the same time.

One or more embodiments of the invention may have the following advantages: automatic construction of optimal SQL match code from the match rule specification, no required input from the end-user, comprehensive error reporting to easily identify errors, and numerous staging areas associated with a single datastore capable of executing the merging process simultaneously.

Figure 6:
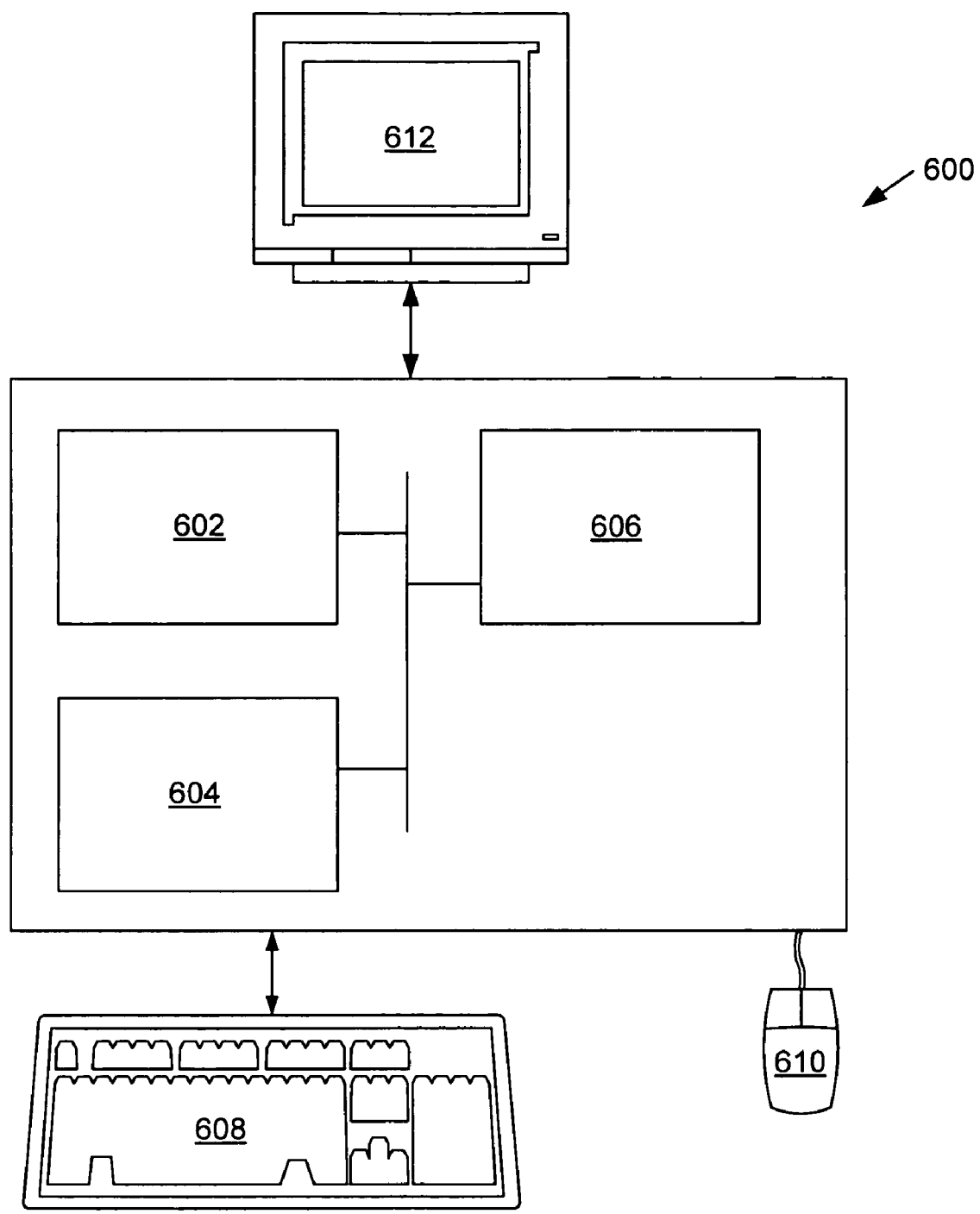
FIG. 6 shows a computer system in accordance with one embodiment of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., staging area, datastores) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to merge incoming data with data in a data store having a plurality of tables, comprising:
    loading an incoming entity into a staging area in a server, wherein the staging area comprises a replica of the plurality of tables;
    identifying a first match attribute of the incoming entity from a match table, wherein the first match attribute is associated with a first rank;
    identifying a second match attribute of the incoming entity from the match table, wherein the second match attribute is a match entity and is associated with a second rank;
    identifying a third match attribute of the match entity from the match table; and
    generating a plurality of match rules based on the first match attribute and the third match attribute, wherein an order of the plurality of match rules is based on the first rank and the second rank;
    executing the plurality of match rules according to the order to identify an entity in the datastore matching the incoming entity; and
    updating the entity in the datastore based on the incoming entity.

2. The method of claim 1, further comprising:
    checking for entities of data with instances populated in the staging area.

3. The method of claim 1, further comprising:
    deleting a duplicate of the incoming entity from the staging area prior to identifying the first match attribute.

4. The method of claim 1, further comprising:
    identifying a link of the incoming entity violating referential integrity; and setting the link of the incoming entity to a value ignored by the merge.

5. A computer readable medium storing instructions to merge incoming data with data in a data store having a plurality of tables, the instructions comprising functionality to:

load an incoming entity into a staging area in a server, wherein the staging area comprises a replica of the plurality of tables;

identify a first match attribute of the incoming entity from a match table, wherein the first match attribute is associated with a first rank;

identify a second match attribute of the incoming entity from the match table, wherein the second match attribute is a match entity and is associated with a second rank;

identify a third match attribute of the match entity from the match table; and generate a plurality of match rules based on the first match attribute and the third match attribute, wherein an order of the plurality of match rules is based on the first rank and the second rank;

execute the plurality of match rules according to the order to identity an entity in the datastore matching the incoming entity; and update the entity in the datastore based on the incoming entity.

6. The computer readable medium of claim 5, further comprising:

checking for entities with instances populated in the staging area.

7. The computer readable medium of claim 5, further comprising:

deleting a duplicate of the incoming entity from the staging area prior to identifying the first match attribute.

8. The computer readable medium of claim 5, further comprising:

identifying a link of the incoming entity violating referential integrity; and setting the link of the incoming entity to a value ignored during the merge.

* * * * *